United States Patent [19]

Eberly

[11] Patent Number: 4,975,180
[45] Date of Patent: Dec. 4, 1990

[54] CRACKING PROCESS

[75] Inventor: Paul E. Eberly, Baton Rouge, La.

[73] Assignee: Exxon Research and Engineering Company, Florham Park, N.J.

[21] Appl. No.: 361,617

[22] Filed: Jun. 5, 1989

[51] Int. Cl.$^5$ .............................................. C10G 11/05
[52] U.S. Cl. .................... 208/114; 208/111; 208/120; 208/149; 502/64; 502/208; 502/73
[58] Field of Search ..... 208/114, 111 M C, 120 M C, 208/111, 120, 149; 502/64, 214, 73

[56] References Cited

U.S. PATENT DOCUMENTS

| 3,507,778 | 4/1970 | Gladrow | 208/111 M C |
| 4,179,358 | 12/1979 | Swift et al. | 502/64 |
| 4,228,036 | 10/1980 | Swift et al. | 502/64 |
| 4,243,556 | 1/1981 | Blanton, Jr. | 208/114 |
| 4,259,212 | 3/1981 | Gladrow | 502/65 |
| 4,283,304 | 8/1981 | Gladrow | 502/64 |
| 4,430,199 | 2/1984 | Durante et al. | 208/114 |
| 4,454,241 | 6/1984 | Pine et al. | 502/68 |
| 4,559,314 | 12/1985 | Shihabe | 502/71 |
| 4,559,315 | 12/1985 | Chang et al. | 502/71 |
| 4,567,152 | 1/1986 | Pine | 208/114 |
| 4,584,091 | 4/1986 | Pine | 208/114 |
| 4,654,138 | 3/1987 | Derouane et al. | 208/114 |
| 4,692,236 | 9/1987 | Sato et al. | 208/114 |
| 4,724,066 | 2/1988 | Kirker et al. | 208/114 |
| 4,765,884 | 8/1988 | Walker et al. | 208/114 |

Primary Examiner—Helane E. Myers
Attorney, Agent, or Firm—Chris P. Konkol

[57] ABSTRACT

A catalytic cracking process is provided wherein a phosphorous containing alumina or an alkaline earth phosphorous containing alumina is added to a catalytic cracking zone for admixture with a zeolite containing cracking catalyst.

13 Claims, No Drawings

CRACKING PROCESS

BACKGROUND OF THE INVENTION

The present invention relates to a catalytic cracking process wherein a phosphorus containing alumina is introduced into the cracking zone for admixture with a zeolite containing cracking catalyst.

In commercial catalytic cracking processes, a trend in recent years has been to use heavier feed stocks which contain more Conradson carbon precursors and metal contaminants such as nickel, vanadium, and iron. As a result, more coke is made in the catalytic cracking zone, leading to higher regenerator temperatures and requiring in some cases the use of catalyst coolers. In addition to excessive coke making, other factors such as metal contaminants lead to deactivation and destruction of the active zeolite component. Product selectivity also suffers, leading to more gas production, especially hydrogen, and lower gasoline yield.

To overcome these adverse effects, at least partially, alumina is frequently added to the catalyst mixture in the cracking zone to assist in bottoms conversion, and increase the catalyst material's resistance to nitrogen and metals. However, coke making is increased. It has previously been found that monoammonium phosphate (MAP) treatment of the alumina is effective in lowering coke while still maintaining the desirably resistance to the aforementioned contaminants.

Hydrocarbon cracking catalysts comprising a zeolite and discrete particles of alumina dispersed in an inorganic oxide matrix are known. See, for example, U.S. Pat. No. 4,283,309 and U.S. Pat. No. 4,259,212. Although the added alumina particles, which in themselves prior to being composited with the other components have relatively little cracking activity, the catalysts comprising the added alumina particles have increased activity, increased vanadium resistance, and increased bottoms conversion. However, such catalysts exhibit undesired coke production.

U.S. Pat. Nos. 4,584,091 and 4,567,152 to Pine disclose that by treating the alumina particles with certain phosphorus compounds prior to compositing the alumina particles with the other catalysts or catalysts precursor components, the catalyst comprising the phosphorus-treated alumina particles has increased selectivity for naphtha components and produces less coke and gas.

U.S. Pat. No. 4,454,241 discloses a phosphorus containing zeolitic catalyst made from a clay starting material. The catalyst is obtained by contacting a partially cation exchanged calcined zeolite-containing catalyst with a dihydrogen phosphate anion, e.g. ammonium hydrogen phosphate or dihydrogen phosphite anion.

U.S. Pat. No. 3,507,778 discloses a zeolite in combination with a phosphate promoted silica-magnesia catalyst for cracking petroleum fractions. Example 4 discloses an ammonium phosphate.

U.S. Pat. No. 4,228,036 discloses a cracking catalyst comprising an alumina-aluminum phosphate silica matrix composited with a zeolite.

U.S. Pat. No. 4,179,358 discloses a cracking catalyst comprising zeolite dispersed in a magnesia-alumina-aluminum phosphate matrix.

U.S. Pat. No. 4,430,199 discloses passivation of contaminant metals on cracking catalysts by phosphorus addition. The phosphorus compound may be ammonium hydrogen phosphate. The phosphorus compound may be impregnated on an inert carrier such as calcined metakaolin clay that can be blended with the catalyst or added to the catalyst. In particular, reference is made to column 3, line 17 to 20 and column 10, lines 20 to 25.

SUMMARY OF THE INVENTION

In accordance with the invention, there is provided a catalytic cracking process utilizing a crystalline metal-losilicate zeolite supported in a non-zeolitic inorganic oxide matrix, wherein discrete particles of phosphorus-containing alumina are then introduced separately into a cracking zone separately from the crystalline metal-losilicate zeolite used therein, that is to say, said phosphorus containing compound is impregnated into alumina particles which are then introduced separately into said cracking zone. It has surprisingly been found that separate addition of such phosphorus containing compounds achieves essentially the same result as a cracking catalyst manufactured to contain the corresponding phosphorus containing alumina. Said discrete particles are prepared by contacting alumina with a salt or non-salt phosphorus containing compound such as phosphoric acid, phosphoric acid, ammonium salts or an alkaline earth metal salt of phosphoric acid or phosphorus acid and mixtures thereof for a time sufficient to incorporate an effective amount of phosphorus in said alumina. When alkaline earth metal salts are used, an effective amount of an alkaline earth metal will also be incorporated with the alumina.

DETAILED DESCRIPTION OF THE INVENTION

The present invention is directed to a catalytic cracking process in which discrete particles of alumina impregnated with a phosphorus containing compound are introduced into a catalytic cracking zone separate from the zeolite catalyst.

The Alumina Component

The alumina used in the present invention is present as discrete particles of alumina treated with a phosphorus containing compound. Suitable alumina starting material for the phosphorus treatment of the present invention is alumina having a total surface area, as measured by the method of Brunauer, Emmett and Teller (BET) greater than 20 square meters per gram ($M^2/g$), preferably greater than 140 $M^2/g$, for example, from out 145 to 400 $M^2/g$. Preferably the pore volume (BET) of alumina will be greater than 0.10 cc/g. The alumina may comprise a minor amount of silica such as suitably from about 0.1 to 15 weight percent, preferably from about 0.1 to 6 weight percent silica, based on the weight of the alumina component of the particles. Preferably, the porous alumina will be bulk alumina. Still, more preferably, the alumina will be in the form of a fluidizable powder having a particle size distribution similar to that of the zeolite containing cracking catalyst, i.e. from 10 to 150 microns. Such aluminas can be obtained by spray drying techniques well known in the art. The term "bulk" with reference to the alumina is intended herein to designate a material which has been preformed and placed in a physical form such that its surface area and porous structure are stabilized. The initial alumina particles are contacted with a phosphorus compound for a time sufficient to composite phosphorus with the alumina particles. If alkaline earth phosphates are used, alkaline earth metals will also be incorporated with the alumina.

Suitable phosphorus containing compounds are any of the prior art phosphorus compounds, including phosphoric acid ($H_3PO_4$), phosphorus acid ($H_3PO_3$), salts of phosphoric acid, salts of phosphorus acid and mixtures thereof. The disclosure regarding the phosphorus compounds in U.S. Pat. Nos. 4,584,091 and 4,657,152 are herein incorporated by reference. Although any soluble salt of phosphoric acid or phosphorus acid, such as alkali metal salts and ammonium salts may be used, the alkali metal salts are less preferred because of the well known poisoning effects of alkali metals for catalytic cracking. Preferred phosphorus-containing compounds are monoammonium phosphate ($(NH_4)H_2PO_4$), diammonium phosphate ($(NH_4)_2HPO_3$), monoammonium phosphite ($(NH_4)H_2PO_3$), diammonium phosphite ($(NH_4)_2HPO_3$), and mixtures thereof. Suitable alkaline earth phosphates contain one or more elements of Group IIA of the periodic table. These include beryllium, magnesium, calcium, strontium, and barium. Preferably, the phosphate additive is magnesium, calcium, strontium or barium phosphate and most preferably magnesium or calcium phosphate. The phosphate compounds are sparingly soluble materials. This property enables more efficient use since limited losses will occur in the effluent water.

The phosphorus containing compounds may be introduced into the catalytic cracking zone, impregnated on alumina particles, the manufacture of such particles generally described above, for complete admixture with the zeolite containing catalyst in the catalytic cracking zone.

Suitable amounts of phosphorus to be incorporated with the alumina include at least about 0.1 wt. % generally, from about 0.1 to 7 wt. %, preferably at least 0.2 wt. %, more preferably from about 0.5 wt. % to 5.0 wt. %, calculated as elemental phosphorus, based on the weight of the alumina. Contact of the alumina with a liquid medium (such as water) comprising the phosphorus compound is suitably conducted at a pH ranging from about 2.0 to about 8.0. Suitable concentrations of the phosphorus compound in the liquid medium may range from about 0.05 to about 5 wt. %. Treating time and temperatures are not critical and may range from about ambient temperature, that is, from about 60° F. to about 250° F. The phosphorus-treated alumina particles are recovered from the liquid medium (dried for example, at a temperature of about 800° F. for 2 hours). The resulting phosphorus-treated alumina particles may suitably be introduced into the catalytic cracking zone in amounts ranging from about 5 to about 50 wt. %, preferably from about 10 to about 30 wt. %, based on total catalyst present in the zone.

Suitable alkaline earth phosphates contain one or more elements of Group IIA of the periodic table. These include beryllium, magnesium, calcium, strontium, and barium. Preferably, the phosphate additive is magnesium, calcium, strontium or barium phosphate and most preferably magnesium or calcium phosphate. The phosphate compounds are sparingly soluble materials. This property enables more efficient use since limited losses will occur in the effluent water.

The alkaline earth phosphates can be added to the alumina in any one or more of several ways. For example, the phosphate can be added to the alumina either by slurry, partial dissolution with acidified aqueous media (i.e., use of phosphoric acid), dry mixing, or mixing coupled with ball milling either dry or in the presence of water. The amount of alkaline earth incorporated onto or with the alumina can range from 5 to 30 wt. % of the alumina when the alkaline earth phosphate is expressed as $M_3(PO_4)_2$. M represents an alkaline earth metal having a valence of $+2$ and can be beryllium, magnesium, calcium, strontium or barium or mixtures thereof. Alternatively, the alkaline earth phosphate can be directly added as a separate particle to the zeolite containing catalyst composite. When expressed as percent of total catalyst, the amount of alkaline earth phosphate is in the range of 1 to 10 wt % as $M_3(PO_4)_2$.

The treated alumina, described above, containing phosphorus or a combination of phosphorus and alkaline earth metal, may be introduced into the catalytic cracking zone, for complete admixture with the zeolite containing catalyst.

The Zeolite Component

Suitable zeolites for use in the process of the present invention are any of the naturally occurring or synthetic crystalline zeolites. Examples of these zeolites include the zeolites designated by the Linde Division of Union Carbide by the letters X, Y, A, L (These zeolites are described in U.S. Pat. Nos. 2,882,244; 3,130,007; 3,882,243; and 3,216,789, respectively). Naturally occurring crystalline zeolites such as faujasite, chabazite, erionite, mordenite, offretite, gmelinite, analcite, etc.; ZSM-5 zeolites, such as described in U.S. Pat. No. 3,702,886; ferrosilicates; zeolites such as those described in U.S. Pat. No. 4,238,318; borosilicate zeolites such as those described in Belgian Patent No. 859656.

In general, the chemical formula of anhydrous crystalline metallosilicate zeolites expressed in terms of moles may be represented by the formula: $0.9 \pm 0.2 M_{2/n}O:W_2O_3:ZSiO_2$, wherein M is selected from the group consisting of hydrogen, hydrogen precursors, monovalent, divalent and trivalent cations and mixtures thereof; n is the valence of the cation and Z is a number of at least 2, preferably at least 3, said value being dependent upon the particular type of zeolite. W, a metal in the anionic framework structure of the zeolite, may be aluminum, gallium, boron, iron, etc. Preferably, the zeolite is a crystalline aluminosilicate zeolite. More preferably, the zeolite is a Y-type zeolite. By "Y-type zeolite" is intended herein a zeolite having a silica to alumina mole ratio of at least about 3, the structure of faujasite and uniform pore diameters ranging from about 6 to about 15 Angstroms. Most preferably, the zeolite has a unit cell size below 24.7 Angstroms. For example, zeolites having unit cell size below about 24.5 Angstroms are known as "stablized" or "ultrastable". Y-type faujasites described in U.S. Pat. No. 3,293,192; U.S. Pat. No. Re 28,629 (Reissue of U.S. Pat. No. 3,402,996); U.S. Pat. No. 4,036,739; U.S. Pat. No. 3,781,199 and U.S. Pat. No. 4,036,739. The zeolites as produced or found in nature normally contain an alkali metal cation such as sodium and/or potassium and/or an alkaline earth metal cation such as calcium and magnesium. The zeolites differ from each other in structure, composition and ratio of silica to metal oxide contained in the crystal lattice. For use as hydrocarbon conversion catalyst component, it is usually necessary to decrease the alkali metal content of the crystalline metallosilicate zeolite to a content of less than 10 wt. %, preferably less than 6 wt. %, more preferably less than 1 wt. %. The alkali metal content reduction, as is known in the art, may be conducted by exchange with one or more metal cations as well as with a hydrogen cation or hydrogen precursor (e.g. $NH_4+$) capable of conversion to the hydrogen cation. Preferred cations include rare earth metals, calcium, magnesium, hydrogen and mixtures thereof. Ion exchange methods are well-known in the art and are described, for example, in U.S. Pat. No. 3,140,249; U.S. Pat. No. 3,140,251 and U.S. Pat. No. 3,142,353, the teachings of which are hereby incorporated by reference. The concentration of hydrogen cation in the finished zeolite will be that concentration equivalent to the difference between the theoretical cation concentrations of the particular zeolite and the amount of cation present in the form of exchanged metal cation and a residual alkali metal cation.

The particle size of the zeolite component may range from about 0.1 to 10 microns, preferably from about 0.5 to 3 microns. Suitable amounts of the zeolite component in the total catalyst will range from about 1 to about 70, preferably from about 1 to about 40, more preferably from about 1o to 40 wt. % based on the total catalyst.

The Inorganic Oxide Matrix Component

The inorganic oxide matrices suitable as component of catalysts for use in the process of the present invention are nonzeolitic inorganic oxides, such as silica, alumina, silica-alumina, magnesia, boria, titania, zirconia and mixtures thereof. The matrices may include one or more of various known clays, such as montmorillonite, kaolin, halloysite, bentonite, attapulgite, and the like. Most preferably, the inorganic oxide will be a silica, or alumina, or a nonzeolitic silica-alumina combined with an appropriate amount of clay. Suitable matrices include the type of matrices prepared from a sol such as described in U.S. Pat. No. 3,867,308; U.S. Pat. No. 3,957,689 and U.S. Pat. No. 4,458,023. The matrix component may be present in the catalyst of the present invention in an amount ranging from about 40 to about 99 weight percent, preferably from about 60 to about 90 wt. % based on the total catalyst. It is also within the scope of the invention to incorporate in the catalyst other materials to be employed in cracking catalysts such as various other types of zeolites, clays, carbon monoxide oxidation promoters, etc.

Zeolite Containing Catalyst Preparation

A preferred method of preparing zeolite containing catalysts for use in the present invention is to react sodium silicate with a solution of sulfuric acid and aluminum sulfate to form a silica-alumina sol. To this can be added slurries of the previously prepared zeolite and clay. In certain preparations, it may be desirable to add some alumina into the mixture for direct incorporation of alumina into the zeolite containing catalyst particles. Preferably, the zeolite is a Y-type zeolite having a unit cell size below about 24.7 Angstroms preferably below 24.5 Angstroms. A sufficient amount of each component is utilized to give the desired final composition. The resulting mixture is then spray dried to produce dry solids. The dry solids are subsequently reslurried in water and washed substantially free of undesired soluble salts. The catalyst is then dried to a residual water content of less than about 15 wt. %. The dried catalyst is recovered. The catalyst of the present invention is particularly suited for catalytic cracking of hydrocarbons.

Catalytic cracking according to the present invention can be conducted in any conventional catalytic cracking manner. Suitable catalytic cracking conditions include a temperature ranging from about 700° to about 1,300° F. and a pressure ranging from about subatmospheric to about five atmospheres, typically from about atmospheric to about 60 psig. The process may be carried out in moving bed, ebullating bed, slurry, transfer line, or fluidized bed operation. Preferably, the process is conducted in a transfer line, or fluidized bed reactor. The process of the present invention can be used to convert any of the conventional hydrocarbon feeds used in catalytic cracking, that is, it can be used to crack naphthas, gas oils and residual oils having a high content of metal contaminants. The process is especially suited for cracking hydrocarbons boiling in the gas oil range, that is, hydrocarbon oils having an atmospheric pressure boiling point ranging from about 450° to about 1,100° F. to yield products having a lower boiling point while producing less coke and gas.

Description of the Preferred Embodiment

The following examples are presented to illustrate the invention. Catalysts of the invention and comparative catalysts were prepared and tested for cracking activity in a EMAT test, a similar but modified form of the standard microactivity test (MAT) described in the Oil and Gas Journal, 1966 vol. 64, pages 7, 84, 85 and Nov. 2, 1971 pages 60–68. Two hydrocarbonaceous oil feedstocks were used, herein designated "FS-5078" and "FS-5363." The characteristics of these feedstocks are given in the following table:

| Feedstock Inspections | | |
|---|---|---|
| | Feedstock No. | |
| | 5078 | 5363 |
| Gravity, °API | 26.2 | 22.5 |
| Sulfur, wt % | n/a | 1.15 |
| Nitrogen, ppm | 569 | 633 |
| Aniline Point | 166.5 | 179 |
| Refractive Index | 1.4803 | 1.4928 |
| Pour Point, °F. | 65 | 90 |
| HiVac C Dist °F. | | |
| IBP, | 582 | 710 |
| 5% | 594 | 740 |
| 10% | 624 | 752 |
| 20% | 655 | 788 |
| 30% | 671 | 810 |
| 40% | 687 | 821 |
| 50% | 705 | 852 |
| 60% | 721 | 873 |
| 70% | 739 | 931 |
| 80% | 756 | 936 |
| 90% | 770 | 966 |
| 95% | 786 | 990 |
| FBP | 802 | 1025 |

The term, "Specific Coke" fund in Table II, is intended herein to be defined as (Wt % Coke on Feed)/x(1−x), were x is the fraction of feed converted to material boiling below 430° F. As usual in catalytic cracking, the coke is included in the material defined as boiling below 430° F. Similarly, in Table II, the "Specific Hydrogen" is defined as (Wt % Hydrogen on Feed)/x(1−x), where x has the same definition as before. In the examples described below, the starting alumina was straight run alumina (SRA) commercially available from Davison Chemical Company.

EXAMPLE 1

For purposes of comparison, an alumina was prepared without the addition of a phosphorus containing compound. In each of two large ball mills, 2092 grams of as received SRA alumina (71.6% solids) was placed and combined with 7 lbs of water. The material was ball milled overnight. The next morning, the slurry was removed from the mills using an additional 7 lbs of water for rinse. The slurry was then filtered. The cake was washed with two 1 gallon portions of water. This was then dried at 150° C. overnight and then calcined 4 hours at 1000° F.

EXAMPLE 2

This preparation involved phosphorus treating the alumina with monoammonium phosphate (MAP) at a level equivalent to 60 grams of MAP per lb of alumina. An amount of 16 lbs of SRA alumina (71.6% solids) was calcined for 4 hours at 1000° F. Separately, a solution of 600 grams of monoammonium phosphate in 70 lbs of water was prepared. To this solution was added 10 lbs of the calcined SRA alumina. The slurry was stirred for 2 hours and then filtered. The cake was washed with two one gallon portions of water, and then dried at 150° C. for 16 hours. The phosphorus containing alumina was finally calcined for 4 hours at 1000° F.

EXAMPLE 3

This preparation involved phosphorus treating the alumina with monoammonium phosphate (MAP) at a level equivalent to 120 grams of MAP per lb of alumina. An amount of 16 lbs of SRA alumina (71.6% solids) was calcined for 4 hours at 1000° F. Separately, a solution of 1200 grams of monoammonium phosphate in 70 lbs of water was prepared. To this solution was added 10 lbs of the calcined SRA alumina. The slurry was stirred for 2 hours and then filtered. The cake was washed with two one gallon portions of water, and then dried at 150° C. for 16 hours. The phosphorus containing alumina was finally calcined for 4 hours at 1000° F.

EXAMPLE 4

This preparation involved treating the alumina with magnesium phosphate, $Mg_3(PO_4)_2$, to the extent of 20% by weight. An amount of 454 grams of as received magnesium phosphate (66% solids) was placed in each of two large ball mills with 1676 grams of as received SRA alumina (71.6% solids) and 7 lbs of water. The material was ball milled for 16 hours. The next morning, the material was removed from each of the mills using 7 lbs of water for rinse. After filtering, the cake was washed with two one gallon portions of water. The solids was dried overnight in air at 150° C. and finally calcined for 4 hours at 1000° F.

Table I show properties of these four aluminas treated in the manner described above.

TABLE I

| | Properties of Treated SRA Alumina | | | | |
|---|---|---|---|---|---|
| | | | | Wt. % P | |
| Example | Treatment | S.A. $M^2/g$ | P.V. cc/g | Actual | Theor. |
| 1 | Ball milled | 251.3 | 0.826 | — | — |
| 2 | MAP (60 g/lb) | 197.9 | 0.775 | 2.39 | 3.56 |
| 3 | MAP (120 g/lb) | 196.1 | 0.761 | 3.36 | 7.12 |
| 4 | $Mg_3(PO_4)_2$ (123 g/lb) | 215.0 | 0.701 | 3.63 | 4.21 |

At the two levels of MAP treatment, the amount of phosphorus takeup was not quantitative. At 60 grams MAP/lb, about 67% reacted with the alumina. This was reduced to 47% at the higher concentration. Both MAP treatments resulted in some loss of surface area. Reaction with magnesium phosphate produced a material containing 3.63% phosphorus.

For MAT type testing in an exploratory unit hereby designated as EMAT, 10% of the above treated aluminas were added to a sample of an equilibrium DA-400 cracking catalyst. Results are shown in the following table II.

TABLE II

| | EMAT Tests with 10% Treated Alumina Added to Eq. DA-400 900° F., 2.8 Cat/Oil | | | | | | |
|---|---|---|---|---|---|---|---|
| $Al_2O_3$ Added | % Conv to 430- | Sp. Coke | Sp. $H_2$ | % Dry Gas | % C5-430 | % Btms |
| None Added | 63.0 | 2.08 | 0.049 | 1.21 | 48.8 | 17.1 |
| Ex. 1 (Ball Milled) | 66.0 | 2.09 | 0.038 | 1.35 | 51.0 | 15.0 |
| Ex. 2 (MAP, 60 g/#) | 68.1 | 1.88 | 0.033 | 1.28 | 53.8 | 12.5 |
| Ex. 3 (MAP, 120 g/#) | 68.1 | 1.95 | 0.037 | 1.27 | 53.6 | 12.5 |
| Ex. 4 (MgPhos) | 68.9 | 1.96 | 0.037 | 1.26 | 54.1 | 11.9 |

All the alumina additions resulted in a substantial increase in conversion; however, a reduction in specific coke only occurred with the phosphorus containing materials. The latter generally produced an incremental 5% increase in gasoline yield with a commensurate lowering in the amount of bottoms.

The scope of this invention is not intended to be limited to the aforementioned examples. Other variations in the process and products of the present invention will be evident to one skilled in the art.

What is claimed is:

1. A process for catalytic cracking a hydrocarbon feed which comprises: contacting said feed in a catalytic cracking zone with an admixture of (a) particles of crystalline metallosilicate zeolite containing catalyst and (b) particles of phosphorus-containing alumina, wherein said phosphorus-containing alumina was made by contacting alumina having a BET surface area greater than 20 square meters per gram with a phosphorus compound selected from the group consisting of phosphoric acid, a salt of phosphoric acid, phosphorus acid, a salt of phosphorus acid, and mixtures thereof, for a time sufficient to incorporate an amount less than about 10 wt. %, calculated as elemental phosphorus based on the weight of said particles of phosphorus-containing alumina, wherein a substantial amount of said particles of phosphorus-containing alumina present in said catalytic cracking zone is not composited with any zeolite containing cracking catalyst and thereby capable of being introduced into said catalytic cracking zone separately from the zeolite containing cracking catalyst particles.

2. The process of claim 1 wherein said phosphorus is present in said discrete particles of alumina in an amount ranging from about 0.1 to about 7.0 wt %, calculated as elemental phosphorus, based on the weight of said discrete particles of alumina.

3. The process of claim 1 wherein said phosphorus compound is selected from the group consisting of an alkaline earth metal or ammonium salt of phosphoric acid or an ammonium salt of phosphorus acid and mixtures thereof.

4. The process of claim 1 wherein said phosphorus is present in said discrete particles of alumina in an amount of at least about 0.1 wt % based on the weight of said discrete particles of alumina, calculated as elemental phosphorus.

5. The process of claim 1 wherein said catalyst comprises from 0.04 to about 2.0 wt. % of said phosphorus.

6. The process of claim 1 wherein said zeolite is a Y-zeolite having a unit cell size below 24.7 Angstroms.

7. The process of claim 1 wherein said catalytic cracking conditions include a temperature ranging from about 700° to about 1,300° F.

8. The process of claim 1 wherein said particles of phosphorus-containing alumina are introduced into a catalytic cracking zone for admixture with zeolite catalyst.

9. The process of claim 1 wherein said particles of phosphorus containing alumina is introduced into a catalytic cracking zone through a conduit also used for introducing zeolite catalyst make-up.

10. The process of claim 1 wherein the zeolite containing catalyst is dispersed in a non-zeolite inorganic oxide matrix.

11. The process of claim wherein the non-zeolite inorganic oxide matrix is selected from the group consisting of silica, alumina, silica-alumina, magnesia, zirconia, titania, boria, chromia, clay, and mixtures thereof.

12. The process of claim 1 wherein the ratio of phosphorus containing alumina to zeolite is in the ratio of 0.10 to 5.

13. A process for catalytic cracking a hydrocarbon feed which comprises: contacting said feed in a catalytic cracking zone with an admixture of (a) particles of crystalline metallosilicate zeolite containing catalyst and (b) particles of phosphorus-containing alumina, wherein said phosphorus-containing alumina was made by contacting alumina having a BET surface area greater than 20 square meters per gram with a phosphorus compound selected from the group consisting of phosphoric acid, a salt of phosphoric acid, phosphorus acid, a salt of phosphorus acid, and mixtures thereof, for a time sufficient to incorporate an amount ranging from about 0.1 to about 7.0 wt %, calculated as elemental phosphorus based on the weight of said particles of phosphorus-containing alumina, said phosphorus being associated with an alkaline earth element according to the formula $M_3(PO_4)_2$, wherein M is a divalent metal of group IIA selected from the group consisting of beryllium, magnesium, calcium, strontium, barium, or mixtures thereof, wherein a substantial amount of said particles of phosphorus-containing alumina present in said catalytic cracking zone is not composited with any zeolite containing cracking catalyst and thereby capable of being introduced into said catalytic cracking zone separately from the zeolite containing cracking catalyst particles.

* * * * *